Sept. 2, 1958 J. W. GRATIAN 2,850,581

COMBINATION RECORDING HEAD

Filed Jan. 11, 1954

INVENTORS.
JOSEPH W. GRATIAN

BY T. L. Bowes
ATTORNEY 2,850,581

Patented Sept. 2, 1958

United States Patent Office 2,850,581

COMBINATION RECORDING HEAD

Joseph W. Gratian, Rochester, N. Y., assignor, by mesne assignments, to General Dynamics Corporation, a corporation of Delaware Application January 11, 1954, Serial No. 403,128

11 Claims. (Cl. 179—100.2)

This invention relates to magnetic recording apparatus and in particular to combination recording heads for use in magnetic recording apparatus.

Magnetic recording systems have heretofore employed several different methods of recording intelligence on a magnetic medium. The most commonly used method is known as longitudinal recording in which the magnetic medium is moved through a field established at a gap across a surface of the recording head in such a way that the medium moves parallel to the lines of force constituting the field through which the medium passes, but transverse recording (in which the lines of force constituting the field through which the medium passes lie at right angles to the direction of movement of the medium and generally in the same plane as the medium) and perpendicular recording (in which the lines of force constituting the magnetic field are generally perpendicular to the plane of the medium) have also been utilized.

Perpendicular recording is advantageous in the low frequency response range but is characterized by relatively poor frequency response characteristics because the recording and reproducing or playback gaps are necessarily longer than those which can be provided in ring type heads commonly used for longitudinal recording. Conversely, longitudinal recording is of greatest utility in the high frequency response region but is relatively deficient in the low frequency band.

It is an object of my invention to provide a new and improved recording head for use in magnetic recording apparatus.

It is another object of my invention to provide a new and improved magnetic recording head which utilizes a plurality of recording methods.

Still another object of my invention is to provide a new and improved magnetic recording head which provides an improved frequency response.

Still another object of my invention is to provide a new and improved magnetic recording head having a first section which records primarily the perpendicular component of a magnetic field and a second section which records primarily the longitudinal component of a magnetic field.

In carrying out my invention I have provided a magnetic recording head comprising two sections. The first section is designed to effect perpendicular recording on a portion of a magnetic record or medium which is preferably a tape having substantial width. The second section is designed to be positioned physically close to the first section. Means is provided for establishing an alternating field in a gap across which the tape is intended to be drawn as by means of a coil encircling a portion of one or both cores, for example. No energizing coil is directly associated with the second section, however. The relative field intensities in the gaps of the two sections are so adjusted, as by the spacing between sections, the intensity of the energizing field and by a shunt associated with the second section, that a primarily perpendicularly oriented field results in the gap of the first section and a primarily longitudinally oriented field is established in the gap of the second section.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which:

Figures 1, 2, 3, 4, 5, 6, 7, 8:
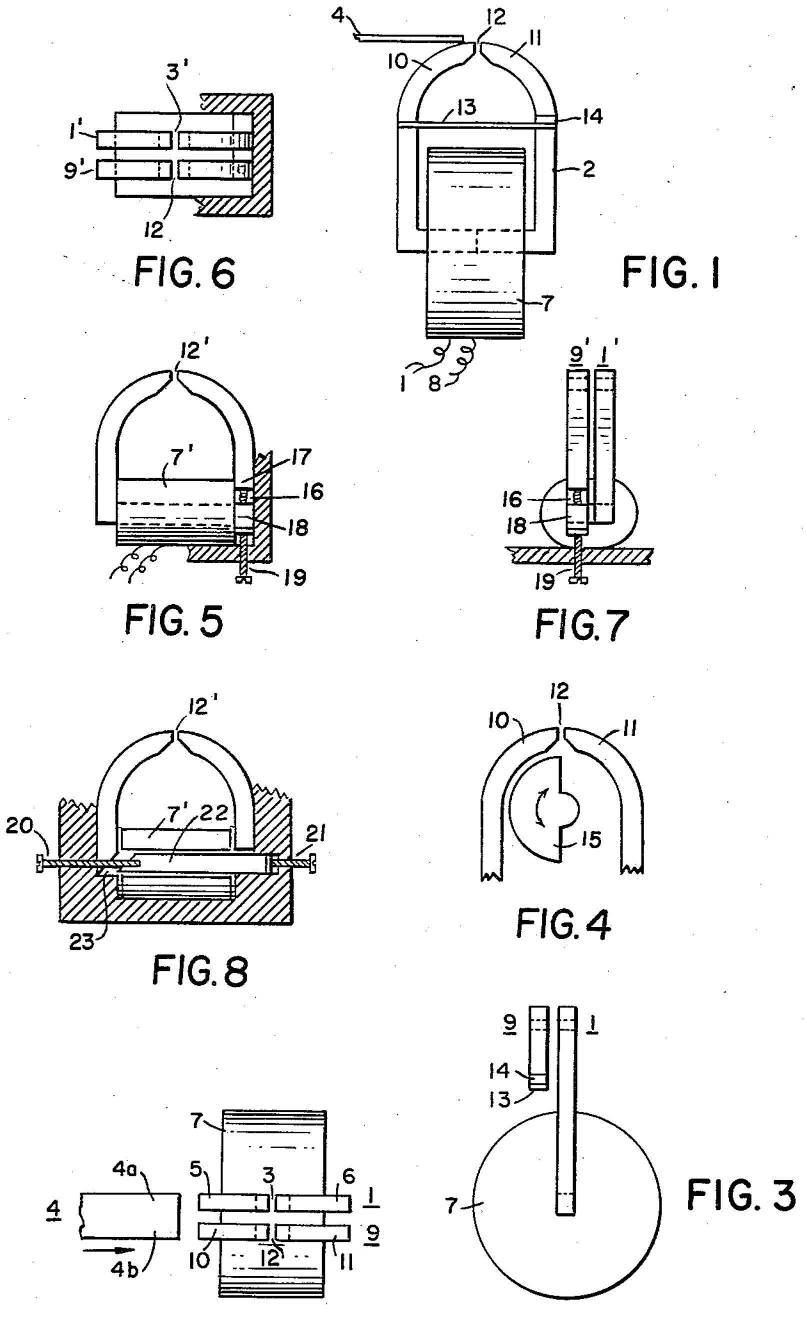
Fig. 1 is a side view of one embodiment of my invention.
Fig. 2 is a top view of the embodiment shown in Fig. 1.
Fig. 3 is an end view of the modification shown in Figs. 1 and 2.
Fig. 4 illustrates a modified form of shunt which is useful in the embodiment shown in Figs. 1 to 3, inclusive.
Figs. 5, 6, 7 and 8 illustrate other modifications of my invention.

In the embodiment shown in Figs. 1 to 3, inclusive, there is shown a magnetic recording head comprising a first section 1 which is shown in the drawings as having a ring type core 2 of suitable magnetic material and preferably laminated. A gap 3 is provided across the surface of core 2, the gap lying transversely to the direction of motion of a suitable magnetic medium such as a tape, indicated by the numeral 4. The core portions defining the gap 3 constitute pole portions 5 and 6. In order to develop an alternating magnetic field across gap 3 there is provided a suitable coil 7 shown in the illustrated form of my invention as encircling the bottom portion of core 2. It is contemplated that both audio and bias current will be fed into coil 7 as by means of suitable leads 8.

My present invention also utilizes a second section 9 positioned adjacent to section 1 and comprising a core including pole portions 10 and 11, these portions being of suitable magnetic material and, preferably, laminated. Pole portions 10 and 11 define a gap 12 lying transverse to the direction of movement of medium 4.

In order to complete a magnetic circuit for the head section 9 and to provide means for varying the intensity of the field in gap 12 without appreciably altering the field in gap 3, there is provided a suitable shunt 13 of suitable magnetic material and which may be made adjustable. In the form of my invention shown in Fig. 1, shunt 13 is suitably secured to the lower end of pole portion 10. The other end of shunt member 13 is disposed adjacent the lower end of pole portion 11, thereby providing a series gap 14. Shunt member 13, in this embodiment of my invention, is made of a material which may be deformed, as by bending, to enable variation of the length of the gap 14. In this arrangement there is thus provided a shunt member fixed to one leg of the core assembly and arranged to provide an adjustable gap between the free end of the shunt member and the other leg of the core assembly. It will be noted that coil 7 does not have direct association with section 9.

The first section 1 is arranged to provide perpendicular recording on the upper portion (as viewed in Fig. 2) of the magnetic medium of tape 4. As is well known, an alternating field across a gap has perpendicular components as well as longitudinal components, the latter being used in longitudinal recording methods. However, satisfactory perpendicular recording can be achieved even with ring type cores such as shown in the drawings provided that intensities of the recording audio and bias fields are sufficiently large, as for example, several times the values which produce optimum longitudinal recording. Thus all components of the illustrated recording apparatus are chosen to establish a sufficiently intense field in gap 3 to produce primarily perpendicular recording effects.

The second section 9 is intended to record primarily by means of longitudinal recording and the required magnetic field in gap 12 is obtained by induction from section 1.

In the proposed arrangement a single coil 7 is employed to produce flux in both gaps 3 and 12. The recording audio and bias currents are first adjusted for optimum recording in gap 3 of the first section. The second section 9 is less tightly coupled to coil 7. The reluctance of the gap or space between sections 1 and 9 may be controlled by proper choice of the spacing between the two core sections as well as the areas of the adjacent surfaces of the two core sections in order to provide a field intensity in gap 12 which is several times lower than the intensity of the field in gap 3. Adjustable magnetic shunt member 13 across section 9 provides a more precise adjustment of the field intensity in gap 12.

Fig. 4 shows an alternate shunting means whereby the gap length of section 9 may be adjusted. This form of shunt comprises a plate or vane 15 rotatably mounted in such a way that gap 12 between pole portions 10 and 11 may be magnetically shunted to a greater or lesser degree depending upon the relative positions of shunt member 15 and pole portions 10 and 11.

In some cases where smaller ratios of the field intensities in gaps 3 and 12 are required, the arrangements shown in Figs. 5, 6 and 7 may be utilized. In these modifications the magnetic circuits of the second section are similar to those of the first section except that an adjustable series gap is provided so that the field intensity in the second gap may be varied without appreciably altering the field intensity in the first gap.

In the arrangement shown in Figs. 5, 6 and 7, the adjustable series gap 16 may be controlled by a suitable coil spring 17 acting in opposition to force applied to shunt 18 through a suitable adjusting member, such as screw 19.

In the arrangement shown in Fig. 8, a pair of adjusting members such as screws 20 and 21 act upon opposite ends of shunt member 22, thereby effecting variations in the length of gap 23.

In the arrangements shown in Figs. 5, 6, 7 and 8, a single coil 7′ is provided to establish magnetic fields in both gaps 3′ and 12′ as best seen in Fig. 6. In the modifications of Figs. 5, 6, 7 and 8, coil 7′ may encircle portions of both sections 1′ and 9′.

While I have shown and described a particular embodiment of my invention, it will be obvious to those skilled in the art that changes and modifications may be made without departing from my invention in its broader aspects. For example, means may be provided to enable selective adjustment of the spacing between sections 1 and 9. I, therefore, aim in the appended claims to cover all such changes and modification as fall within the true spirit and scope of my invention.

What I claim is:

1. A magnetic recording head comprising first and second sections, each of said sections having a core of magnetic material and a gap extending transversely across a surface thereof, means for establishing a magnetic field in said first section and across a gap thereof, said second section being inductively coupled to said first section for establishing a magnetic field in said second section, said inductive coupling constituting the sole source of magnetic energy in said second section.

2. The magnetic recording head of claim 1 in which the intensity of said field in said first section is sufficiently great to produce perpendicular recording on a first portion of a medium adjacent said gaps and the intensity of said field in said second section is sufficiently lower than the field of said first section to produce longitudinal recording on another portion of said medium.

3. The magnetic recording head of claim 1 provided with means for varying the intensity of the field in one of said gaps relative to the intensity of the field in the other of said gaps.

4. The magnetic recording head of claim 3 in which said intensity varying means comprises an adjustable series air gap in said second section.

5. A magnetic recording head comprising a first section having a core of magnetic material, a gap extending transversely across a surface thereof, a coil encircling a portion of said core for establishing an alternating magnetic field in said gap, means for causing said field to have sufficient intensity to produce a perpendicular recording on a portion of a magnetic medium disposed in said field, a second section having a core of magnetic material and a gap extending transversely across a surface thereof, the last-mentioned being magnetically coupled to said first section, said second section being so positioned that another portion of said magnetic medium is disposed in the field established in the gap in said second section, the coupling between said sections being chosen to provide a field intensity in the last-mentioned gap which is substantially lower than the intensity of the field in the first mentioned gap.

6. The magnetic recording head of claim 5 in which means is provided for varying the coupling between said sections.

7. The magnetic recording head of claim 5 in which the second section is provided with an adjustable magnetic shunt for adjusting the intensity of said second field.

8. The magnetic recording head of claim 1 in which the intensity of said field and said first section is sufficiently great to produce perpendicular recording on a magnetic medium adjacent said gap of said first section and the intensity of said field in said second section is sufficiently lower than the field of said first section, to produce longitudinal recording on a magnetic medium adjacent said gap of said second section.

9. A magnetic recording head comprising first and second sections, each of said sections having a core of magnetic material and a gap extending transversely across a surface thereof, means for establishing a magnetic field in said first section and across a gap thereof, said second section being located adjacent said first section, means for varying the intensity of the field in one of said gaps relative to the intensity of the field in the other of said gaps, said intensity varying means comprising an adjustable series air gap in said second section.

10. A magnetic recording head comprising first and second sections, each of said sections having a core of magnetic material and a gap extending transversely across a surface thereof, means for establishing a magnetic field in said first section and across a gap thereof, said second section being located adjacent said first section and having means to vary the reluctance of its magnetic path.

11. The magnetic recording head of claim 10 in which said field establishing means comprises a single coil encircling portions of both of said cores.

References Cited in the file of this patent

UNITED STATES PATENTS

| | | |
|---|---|---|
| 2,423,339 | Newman | July 1, 1947 |
| 2,483,123 | Clapp | Sept. 27, 1949 |
| 2,789,274 | Saeger | Sept. 14, 1954 |

OTHER REFERENCES

Magnetic Recording, S. J. Begun, 1949, pages 19–53.

UNITED STATES PATENT OFFICE

CERTIFICATE OF CORRECTION

Patent No. 2,850,581 September 2, 1958

Joseph W. Gratian

It is hereby certified that error appears in the printed specification of the above numbered patent requiring correction and that the said Letters Patent should read as corrected below.

Column 1, line 35, after "poor" insert -- high --.

Signed and sealed this 5th day of May 1959.

(SEAL)
Attest:

KARL H. AXLINE
Attesting Officer

ROBERT C. WATSON
Commissioner of Patents